United States Patent [19]

Childre et al.

[11] Patent Number: 5,118,048

[45] Date of Patent: Jun. 2, 1992

[54] DUAL DRAG FISHING REEL

[75] Inventors: Casey J. Childre; David B. Peed, both of Foley, Ala.

[73] Assignee: Team Lew's, Inc., Foley, Ala.

[21] Appl. No.: 466,461

[22] Filed: Jan. 17, 1990

[51] Int. Cl.⁵ .................... A01K 89/01; A01K 89/027
[52] U.S. Cl. .................................... 242/245; 242/267
[58] Field of Search ............... 242/243, 244, 245, 246, 242/267, 268, 230, 231, 233, 323

[56] References Cited

U.S. PATENT DOCUMENTS

| | | | |
|---|---|---|---|
| 2,500,445 | 3/1950 | Worden | 242/267 X |
| 2,638,762 | 5/1953 | Rayner | 242/267 |
| 3,198,457 | 8/1965 | Holahan | 242/268 |
| 3,284,019 | 11/1966 | Wood | 242/264 X |
| 3,307,799 | 3/1967 | Ransom | 242/283 X |
| 3,814,349 | 6/1974 | Menne | 242/264 |
| 3,948,465 | 4/1976 | Scusa | 242/264 |
| 3,967,791 | 7/1976 | Morishita | 242/268 |
| 4,191,343 | 4/1980 | Morishita | 242/242 |
| 4,200,248 | 4/1980 | Puryear | 242/306 X |
| 4,328,937 | 5/1982 | Holahan et al. | 242/265 |
| 4,416,427 | 11/1983 | Kawai | 242/244 |
| 4,524,923 | 6/1985 | Tunoda et al. | 242/245 |
| 4,529,142 | 7/1985 | Yoshikawa | 242/243 |
| 4,572,455 | 2/1986 | Noda | 242/282 |
| 4,616,792 | 10/1986 | Tunks | 242/266 |
| 4,634,074 | 1/1987 | Ohmori | 242/245 X |
| 4,730,782 | 3/1988 | Young | 242/268 |
| 4,732,348 | 3/1988 | Young | 242/258 |
| 4,815,676 | 3/1989 | Young | 242/267 |

Primary Examiner—Katherine Matecki
Attorney, Agent, or Firm—Lockwood, Alex, Fitzgibbon & Cummings

[57] ABSTRACT

An improved spinning reel is disclosed wherein the spinning reel has a rotor drag system assembly located on its handle. The rotor drag system allows the fisherman to apply a selective amount of frictional force to the reel handle and reel main drive gear. The selective frictional force, when set less than the force on the spool drag assembly, allows the reel main drive gear and the fishing reel rotor driven thereby, to remain stationary while fighting a fish, even when the reel handle is being turned. This prevents subsequent twist from being imparted to the fishing line. The rotor drag incorporates a rotor drag assembly containing an input shaft which drivingly engage the spool drive shaft. A clutch plate is provided between the reel handle and the input shaft to provide selective transmission of rotational handle force to the input shaft.

27 Claims, 5 Drawing Sheets

DUAL DRAG FISHING REEL

BACKGROUND AND SUMMARY OF THE INVENTION

The present invention relates generally to an improved fishing reel, and more particularly, to a spinning or spin cast fishing reel having a first spool drag assembly and a second rotor drag assembly operatively associated with the reel handle thereof. In this regard, an important aspect of the present invention concerns a line-non-twisting dual drag assembly (a spool drag and a rotor drag) which finds advantageously utility in fishing reels of the type wherein the spool is stationary during a cast.

Drag assemblies have been widely utilized on fishing reels to selectively regulate the resistance to spool rotation in the line pay-out direction when a fish is hooked. Typically, with a spinning or spin cast reel, a fisherman activates the drag assembly after a cast by turning the reel handle to close the bail arm so that the bail arm line roller engages the line, and the bail arm line roller which is attached to the rotor, retrieves the fishing line after a cast. In this mode, the turning of the handle drives the rotor in a rotational orbit around the stationary line spool, thereby retrieving the fishing line and wrapping it around the line spool. If a fish is hooked and the force exerted by the fish is greater than the spool drag assembly force, the fisherman continues to turn the reel handle, but no line is reeled in. In this instance, the fishing reel rotor continues to turn or orbit around the line spool in the line retrieval direction. The rotor orbits the spool, which may either remain stationary or may be turned in the line pay-out direction by the force exerted thereon of the hooked fish. In either occurrence, the continued turning of the handle by the fisherman imparts multiple twists to the fishing line as it orbits the spool. If the fish is exerting a force greater than that exerted by the spool drag assembly, the rotor does not retrieve line onto the line spool, but rather twists the line as it orbits the spool. When the fish eventually tires and the force exerted by the fish becomes less than the spool drag assembly force, the orbiting rotor retrieves the line and winds it around the spool. However, in this instance, some, but not all of the line twist is removed. The line still contains some remaining twist and the twisted line is wrapped onto the spool. After prolonged fishing periods, however, the fishing line will become twisted to the point where it has difficulty passing cleanly through the line guides in that its twist interferes with subsequent casting. This twisted line must then be subjected to either a manual detwisting operation or removed from the spool. This situation requires frequent replacement of the line spool with fresh line.

Line twist is caused by the rotor revolving when the reel handle is turned because the reel handle is directly geared to the reel rotor. The spool drag of a conventional spinning or spin cast fishing reel only applies a rotational resistance force to the spool and the rotor continues to spin in response to turning of the handle even when the fish force is equal to or greater than the spool drag force. Twist is thereby continuously imparted to the fishing line. Conventional spool drag assemblies are located either on the rear of the reel body (to permit easier access thereto) or on the front of the reel on the spool front face. In either instance, the spool main shaft reciprocates and moves the spool forward and rearward in a cyclic motion.

The present invention is directed to a construction which avoids the aforementioned shortcomings of spinning and spin cast fishing reels.

Accordingly, it is a general object of the present invention to provide a new and improved fishing reel of the type wherein the spool is stationary during a cast which reel includes a drag assembly (i.e. a spool drag and a rotor drag) that substantially reduces the amount of twist imparted to the fishing line.

Another object of the present invention is to provide a spinning or spin cast fishing reel having a first spool drag assembly and a second drag assembly associated with the handle which second drag assembly allows the fisherman to apply a selective rotational resistance between the fishing reel handle and the fishing reel rotor.

It is yet another object of the present invention to provide a kit of parts for converting an existing fishing reel having a standard first, spool drag adjustment assembly into a fishing reel also having a second rotor drag adjustment assembly disposed on the reel handle.

It is still a further object of the present invention to provide a second drag assembly operatively associated with the handle of a spinning or spin cast fishing reel, which reel handle second drag assembly allows easy conversion of the fishing reel from right-hand to left-hand operation.

In a spinning or spin cast fishing reel incorporating the principles of the present invention, a second drag assembly is provided on the fishing reel handle which is operatively connected to the fishing reel main drive gear and which permits the fisherman to turn the fishing reel handle while maintaining the fishing reel main drive gear, drive shaft, and the reel rotor in a stationary position so as not to impart any substantial twist to the fishing line.

In another aspect of the present invention, the handle of the spinning or spin cast fishing reel has a second drag assembly housing disposed between the reel handle and the reel main drive gear, which housing contains rotatable clutch means to selectively vary the rotational drive resistance between the reel handle and rotor of the reel.

These and other objects, features and advantages of the present invention will be clearly understood through a consideration of the following detailed description.

BRIEF DESCRIPTION OF THE DRAWINGS

In the course of this detailed description, reference will be frequently made to the attached drawings in which.

DESCRIPTION OF THE PREFERRED EMBODIMENT

Figure 1:
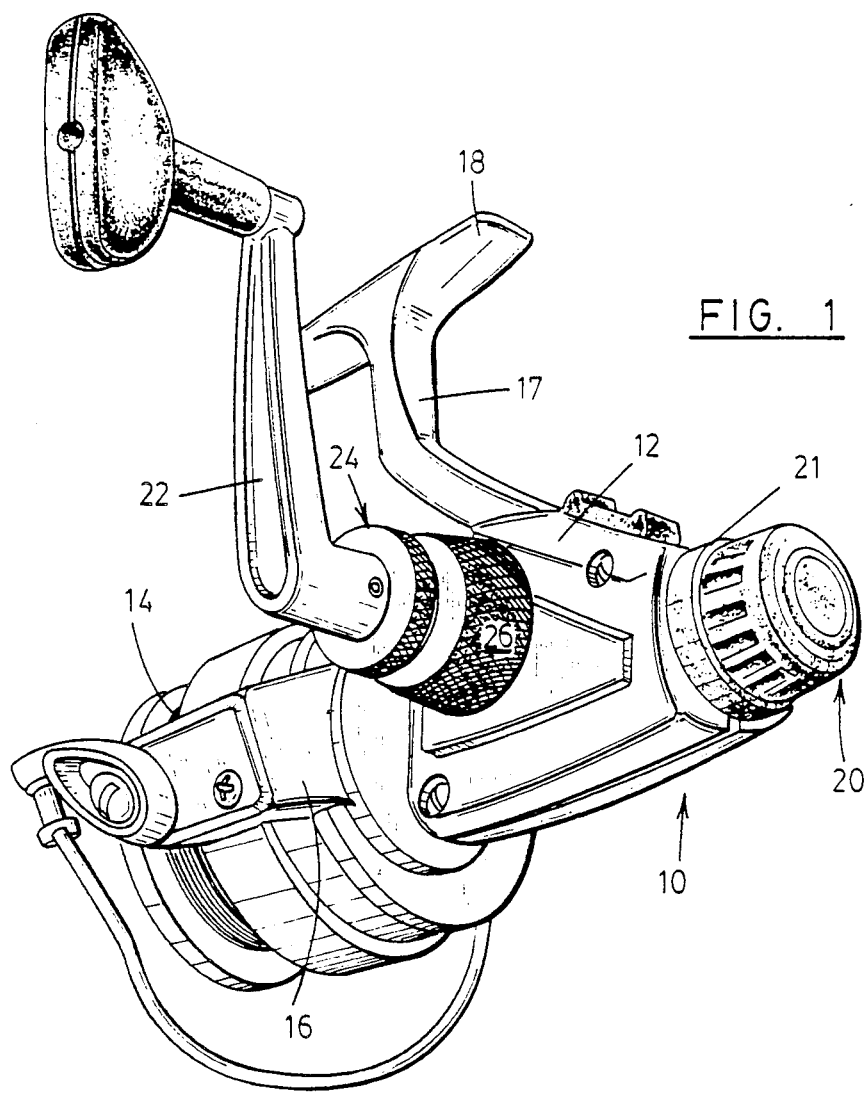
FIG. 1 is a perspective view of a fishing reel incorporating the principles of the present invention.
Figure 2:
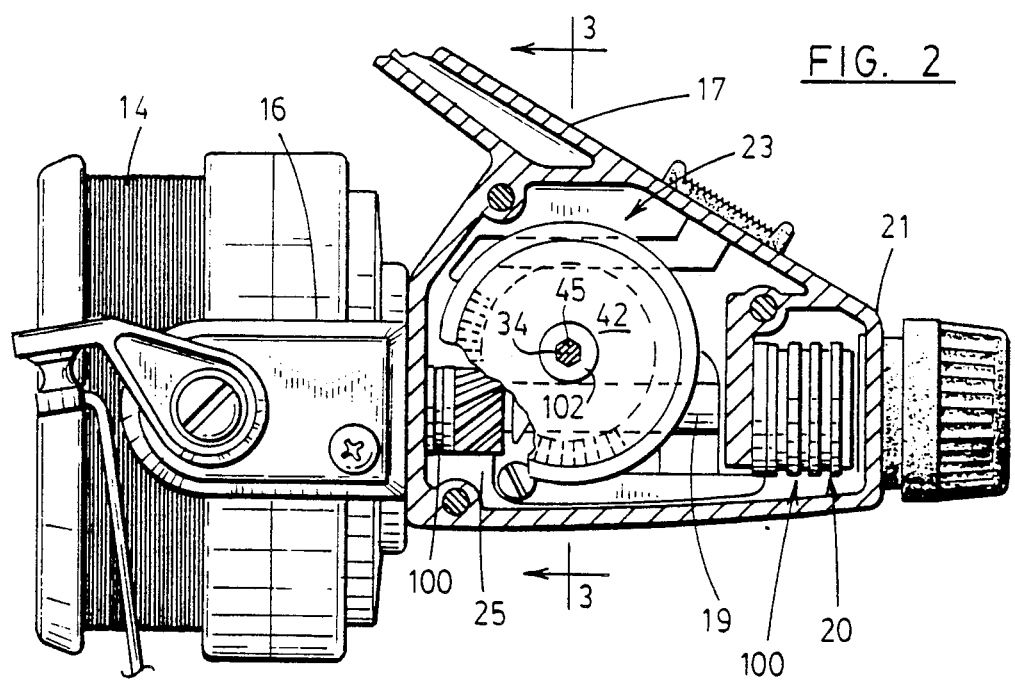
FIG. 2 is a partial sectional elevation of the internal portion of the fishing reel shown in FIG. 1 illustrating a preferred embodiment of the present invention.

The present invention is directed to a line non-twisting system for fishing reels of the type wherein the spool is stationary during the cast such as, for example, a spinning or spin cast reel. This line non-twisting system includes a conventional spool drag assembly and a rotor drag assembly associated with the handle which enables the fisherman to selectively vary the resistance of the rotor to rotation due to turning of the spinning reel handle.

In the embodiment shown in FIGS. 1-4, a spinning reel 10 includes a rotor drag assembly incorporating the principles of the present invention. The spinning reel 10 comprises standard fishing reel components, such as a spinning reel body 12, a fishing line spool 14 which is supported on a reciprocating spool main shaft 19, which main shaft 19 passes through a pinion gear 25. The spool main shaft 19 is supported within the reel body 12 by extending into a line spool drag assembly 100. The spinning reel body portion 12 has a conventional reel stem 17 and a pair of mounting feet 18 extending therefrom for mounting the fishing reel 10 onto a fishing rod (not shown). A standard fishing line spool drag assembly control knob 20 located on the rear end 21 of the reel 10 supplies a selective rotational resistance force directly to the spool main shaft 19. The fishing reel 10 has a conventional reel drive mechanism 23, which includes a drive input shaft 34 which engages the main drive gear 42 by way of the pinion gear 25 which drivingly and threadedly engages the rotor main drive gear 42 near the forward end of the spool main shaft 19. The spool main shaft 19 is coupled at its forward end to the to the line spool 14. As is conventional in spinning reels, the main drive gear 42 serves to reciprocate the spool main shaft 19 when the main drive gear 42 is driven.

Figure 3:
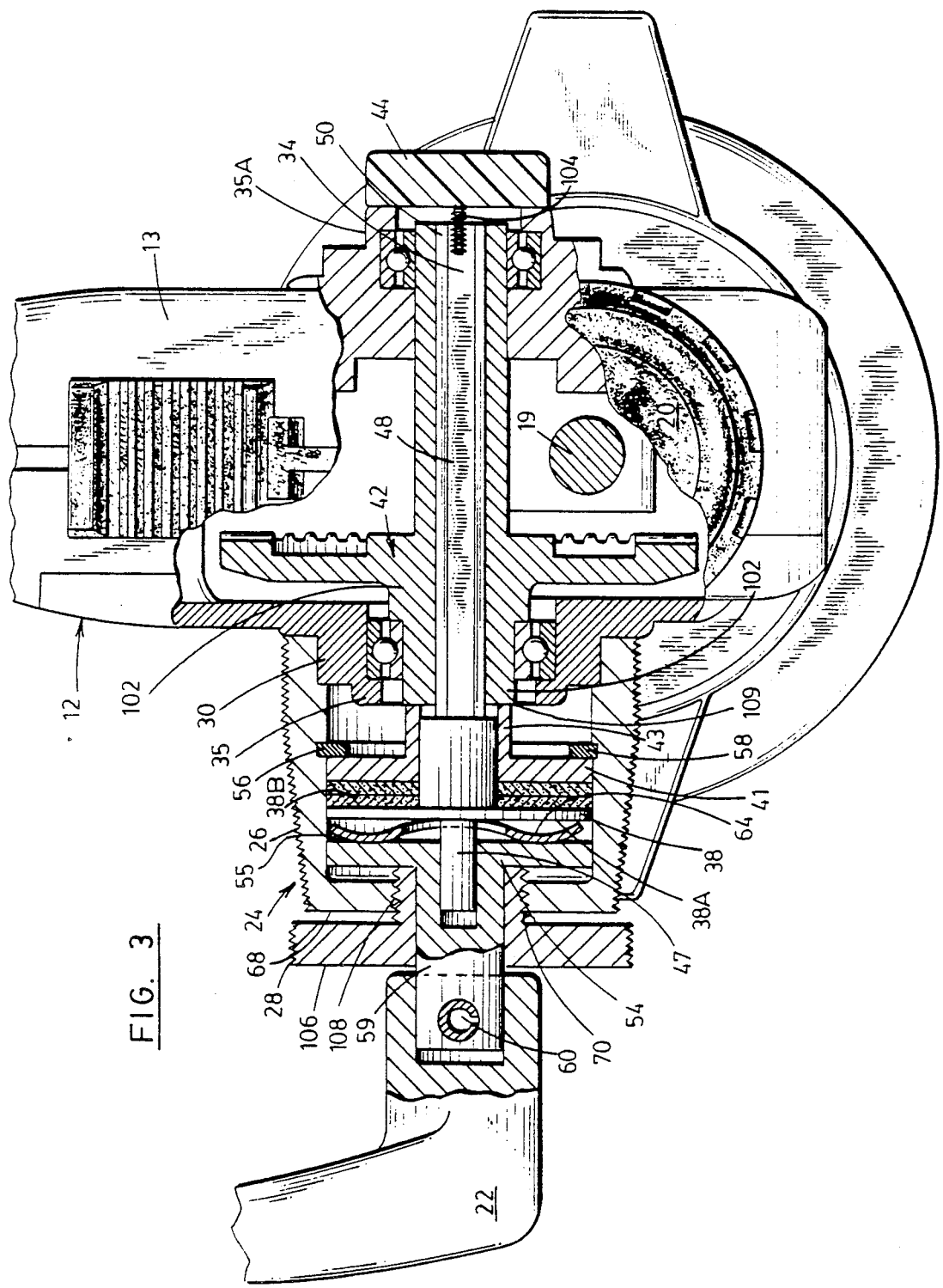
FIG. 3 is a sectional view taken along lines 2—2 of FIG. 2.

The second or rotor drag assembly 24 is interposed between the fishing reel handle 22 and the reel body 12. The rotor drag assembly 24 generally includes a housing 26 having a hollow cavity 33 formed with means for engaging the reel body, shown as an interior circumferential rim 32 which abuttingly engages an outwardly extending reel body shoulder 30. Although FIG. 3 illustrates a large opening 35 in the reel body 12 surrounded by the shoulder 30, the reel body 12 may have a conventionally smaller opening. The handle drag assembly 24 may also be supported on the reel body 12 by a spacer disc 41 having an axial hub 43 which engages the shoulder or axial hub 102 of the reel main drive gear 42.

Figure 4:
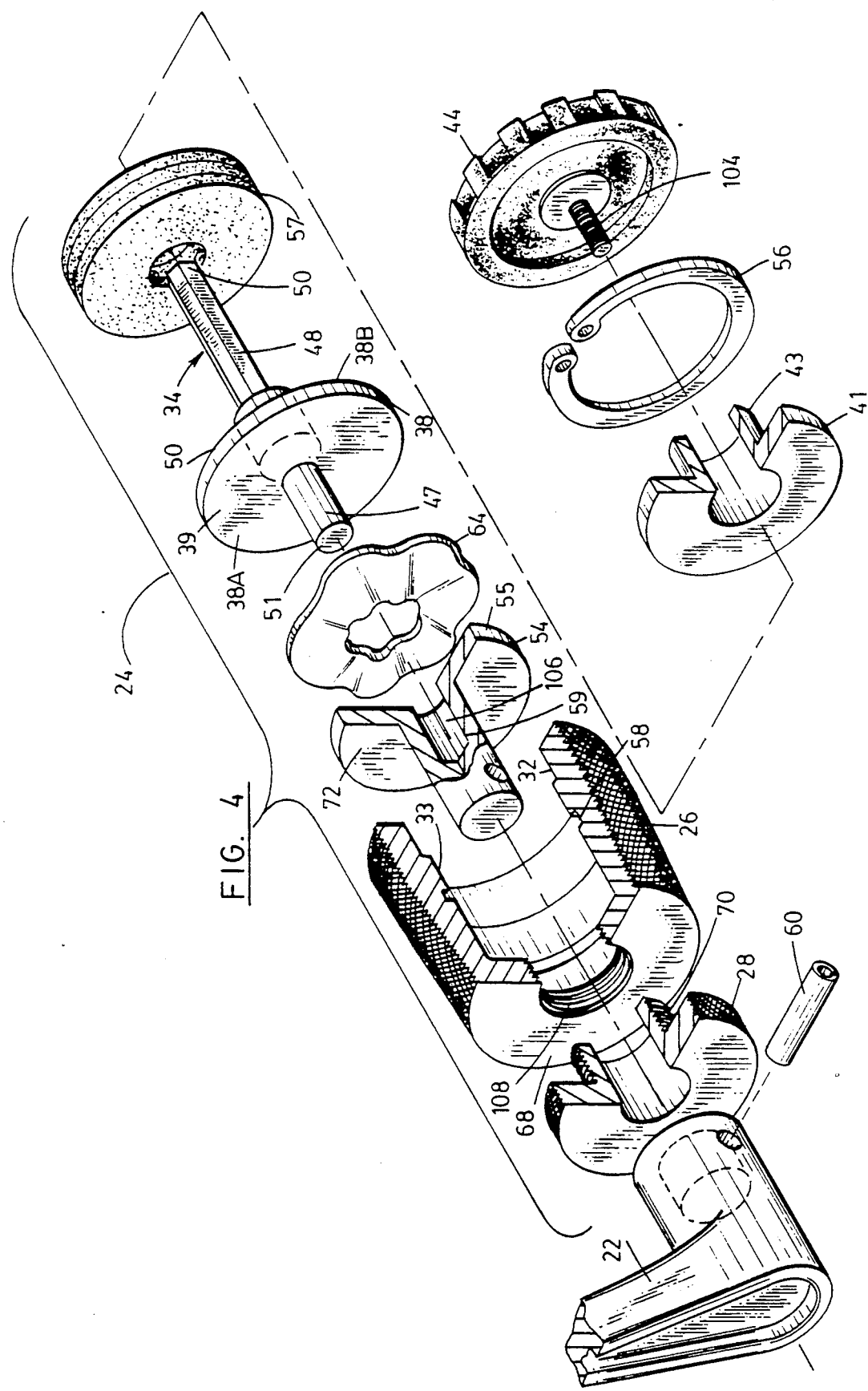
FIG. 4 is an exploded sectional view of the handle drag system assembly shown on the fishing reel of FIG. 1.

An input shaft 34 extends axially within the second or rotor drag assembly housing cavity 33 and has an integral radial flange 38. Although the radial flange 38 is depicted in FIG. 4 as integrally formed on the input shaft 34, it will be appreciated that the radial flange 38 can also be a separate circular flange member attached to the input shaft 34 by other means, such as a shaft key or set screw. On its outboard end 51, the input shaft 34 has a handle shaft 47 extending from one side 38A of the radial flange 38 toward the reel handle 22. On its inboard end 50 the input shaft 34 has an axial extension 48 extending from the opposite side 38B of the radial flange 38 inwardly into the reel body 12. The input shaft 34 extends through an axial hub 102 of the main drive gear 42 to provide a driving connection so that the reel main gear 42 rotates when the input shaft 34 is rotated. The input shaft axial extension 48 has a hexagonal cross-section which interlocks with a central hexagonal keyway 45 extending through the reel main drive gear axial hub 102. The input shaft 34 is angularly offset from the spool main shaft 19 within the reel body 12 so that the main drive gear 42 meshes with the pinion gear 25. Thus, rotation of the input shaft 34 turns the main drive gear 42, which in turn, rotates the pinion gear 25 to drive the fishing reel rotor 16.

At the inboard end 50 of the axial extension 48, the input shaft includes means for mounting the second or rotor drag assembly 26 on and engaging the reel body 12 on the reel body side 13 opposite the reel handle 22, which are shown as a threaded endcap 44 having a screw 104 which is received within the input handle shaft 34 and holds the rotor drag assembly 24 in place on the reel body 12. The input shaft axial extension hexagonal cross-section 49 preferably extends uniformly along a substantial length of the input shaft 34 so that the input shaft 34 can easily engage the reel main drive gear 42 from the reel body opposite side 13. In this instance, the endcap 44 may rotate with the input shaft 34 against either the reel body shoulder 35A or the reel main drive gear axial hub 102 when the reel handle 22 is turned. Therefore, the present invention can easily convert the fishing reel 10 from right-hand to left-hand operation.

Although the input shaft 34 is illustrated as having a hexagonal cross-section 49 which engages the reel main drive gear 42, it will be understood that alternatively, an input shaft 34 may be provided which has two shaft portions with two sets of screw threads thereon. In such a construction, the threads screw directly into either the main drive gear 42 or a central threaded insert thereof. One set of screw threads is dimensioned to threadedly engage one side of the reel main drive gear 42 while the second set is dimensioned to threadedly engage the other side of the reel main drive gear. The two sets of threads thereby allow the rotor drag assembly to be easily and selectively mounted on either side of the reel body.

Means to variably transmit drive from the reel handle 22 to the input shaft 34 is best shown in FIGS. 3-4 as a drag or clutch plate 54 which has an axial extension 59 which extends through the rotor drag housing assembly cavity 33 and is attached to the reel handle 22 by a fastening pin 60. A wavespring 64 is disposed on the input shaft handle 47 between the clutch plate 54 and the input shaft radial flange 38. Although a wavespring is shown, it will be appreciated that one or more drag discs can be used in their place. The wavespring or drag-discs are disposed between a clutch face 55 of the clutch plate 54 and a clutch face 39 of the radial flange 38 to obtain the desired tranmission of rotational force from the reel handle 22 to the input shaft 34 by way of the clutch plate 54.

The outboard end input shaft axial extension 47 extends through the clutch means 62 into a bore 106 of the clutch plate 54. A series of washers or spacers 57 may be positioned on the inboard side of the radial flange 38 to properly position the input shaft 34 within the rotor drag assembly housing 26. These spacers 57 are held in place within the drag assembly housing cavity by a washer or C-ring 56 which snaps into a drag housing recess 58.

A drag adjustment wheel 28, which allows for adjustment of the force transmitted from the reel handle 22 to the input shaft 34, may be threadedly received in a central bore 108 disposed in the outboard end 68 of the drag assembly housing 26. The drag wheel 28 has an elongated hub 70 which, when turned, engages a face 72 of the clutch plate 54. When turned, the drag wheel 28 moves inwardly along the clutch plate axial extension 59 against the back 72 of the clutch plate 54 and forces the clutch plate clutch face 74 against the wavespring 64 or drag discs 65. Thus, the drag wheel 28 provides a means for selectively applying force to the input shaft 34 from the reel handle 22. This compression increases the friction between the wave spring or drag discs and the input shaft radial flange clutch face 39. This increased friction serves to keep the input shaft 34 frictionally engaged to the reel handle 22. Conversely, when the rotor drag is adjusted by the drag wheel 28 so that the rotor drag assembly force is less than the force exerted by the hooked fish, the input shaft radial flange 54 will slip against the input shaft radial flange 39, holding it in place and rotational drive will not be transmitted to the rotor 16. As the fish fights, and the fisherman turns the reel handle 22, the reel rotor 16 is prevented from orbiting around the spool and imparting additional twist to the fishing line.

Since the second drag assembly includes a self-contained input shaft 34, the present invention can be used to convert an existing one drag system fishing reel to a two-drag system fishing reel with minimal effort and modification to the existing fishing reel structure.

Figure 5:
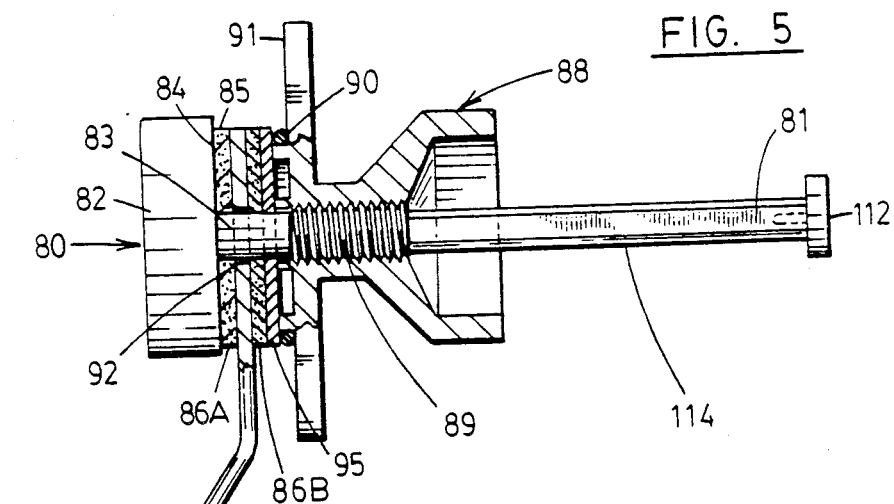
FIG. 5 is a plan view of a second embodiment of a dual drag assembly reel handle incorporating the principles of the present invention.
Figure 6:
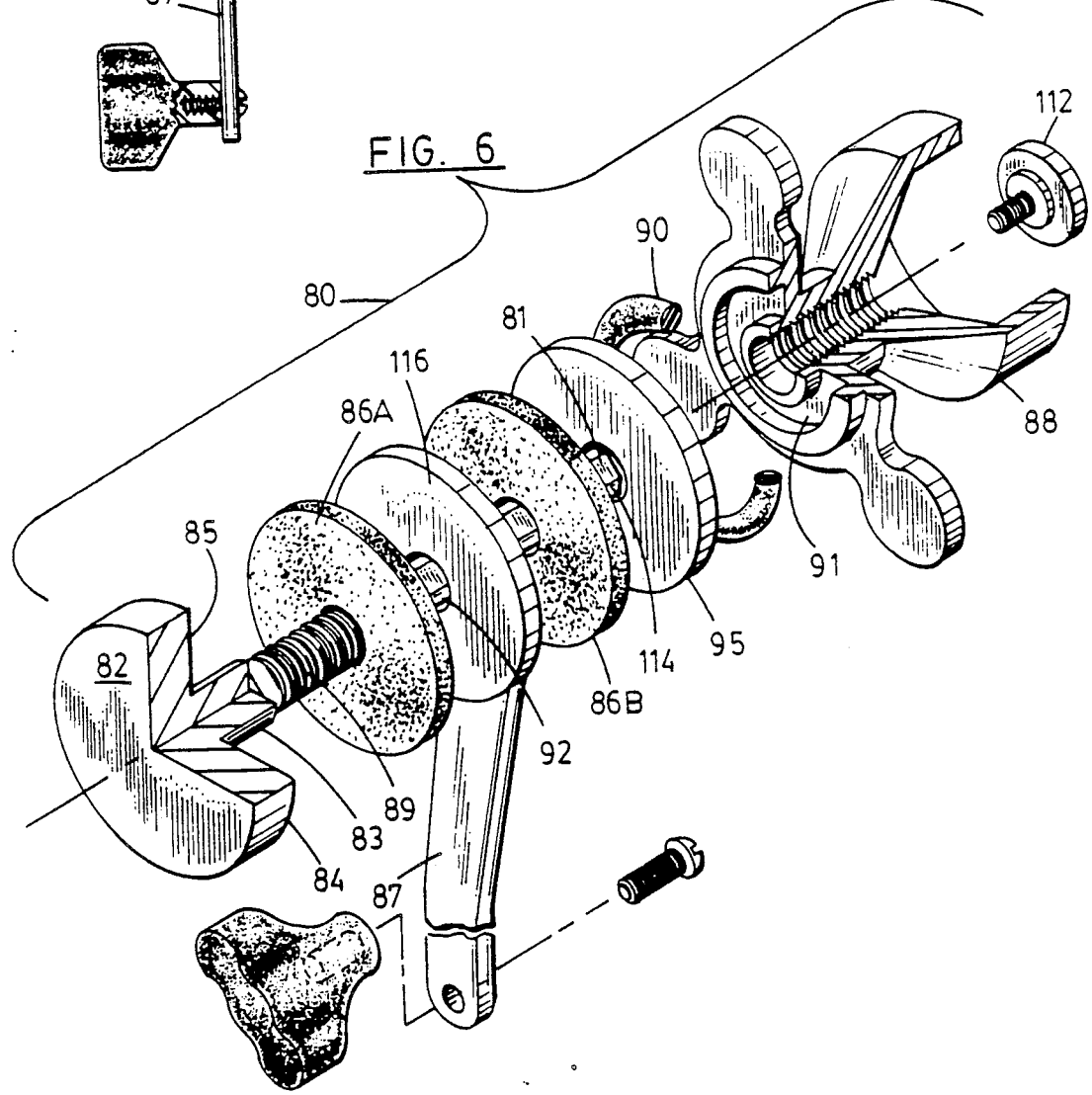
FIG. 6 is an exploded view of the reel handle of FIG. 5.

FIGS. 5 and 6 illustrate a second embodiment of a rotor drag system fishing reel handle 80 of the present invention in which the clutch means is located outside of the second drag assembly housing 88. As depicted, the second-rotor drag assembly 80 includes a handle input shaft 81 having an enlarged radial flange portion 82 and an axial extension 83 which carries most of the rotor drag system components. Similar to the first embodiment, described above and shown in FIGS. 1–4, the input shaft 81 extends into the reel body and operatively engages the reel main drive gear in a conventional manner and is held on the reel body by an appropriate endcap 112.

The inside surface 84 of the input shaft 81 is appropriately finished so that the radial flange 82 serves as a clutch plate 85. Two drag discs 86A, 86B are located on the input shaft 81 on opposite sides of the reel handle arm 87. One drag disc 86A is located between the clutch plate 85 and the reel handle arm 87 so that the drag disc 86A abuts the inside surface 84 of the clutch plate 85 and an outer surface 116 of the reel handle arm 87. A drag adjustment wheel 88, which permits adjustment of the force transmitted from the reel handle arm 87 to the clutch plate 85 and the input shaft 81, is threaded into the input shaft 81 at a threaded portion 89 thereof. A spacer or washer 95, may separate the remaining drag disc 86B from the drag adjustment wheel 88.

The opening 92 of the reel handle arm 87 is larger than the cross-section of the input shaft extension 83 to prevent any substantial frictional contact between the two to ensure that there is no independent direct drive transmitted from the reel handle arm 87 to the input shaft 81 apart from drag disc 86A. Instead, drive is transmitted from the reel handle arm 87 to the input shaft 81 when a surface of the reel handle arm drivingly engages the drag disc 86A. An elastomeric O-ring 90 is illustrated as interposed between one face 91 of the drag adjustment wheel 88 and the washer 95 and serves to hold the washer 95 in place on the input shaft axial extension 83 against the reel handle arm 87 and its associated drag discs 86A, 86B. Although an O-ring 90 is illustrated in FIG. 6, it will be appreciated that drag disc 86B can be substituted in place thereof. In such instances the drag disc 86B will take the position of the washer 95 and vice-versa.

When turned, the drag adjustment wheel 88 moves outwardly (to the left in FIG. 5) toward the input shaft radial flange 82 and forces the drag discs 86A, 86B, washer 88 and reel handle arm 87 against the input shaft clutch face 85. Therefore, when the drag adjustment wheel 88 is turned on the threaded input shaft portion 89, the wheel 88 is fixed in its position with respect to the input shaft radial flange 85, thereby maintaining any compressive force applied against the drag discs 86A, 86B by the drag adjustment wheel 88.

When the drag disc 86A is compressed between the clutch plate inner surface 84 and the handle arm 87 and the reel handle arm 87 is turned, the reel handle arm 87 will rotate the input shaft 81 provided that the force exerted by the fish on the line spool is less than the frictional force between the drag disc 86A and handle arm 87. If the force exerted by the fish is greater than that frictional force, the reel handle arm 87 will rotate on the input shaft extension 83 and the drag disc 86A, will slip against the input shaft clutch plate surface 84 and drive will not be transmitted to the rotor.

Similar to the first embodiment, the second or rotor drag assembly 80 can also be used to convert the spinning reel from right-hand to left-hand operation in that the input shaft 81 has a uniform hexagonal portion 114 which is threaded to receive an endcap 112. Alternatively, as mentioned before, the input shaft 81 may be threaded with two sets of screw threads for engaging either side of the reel main drive gear 42.

Figure 7:
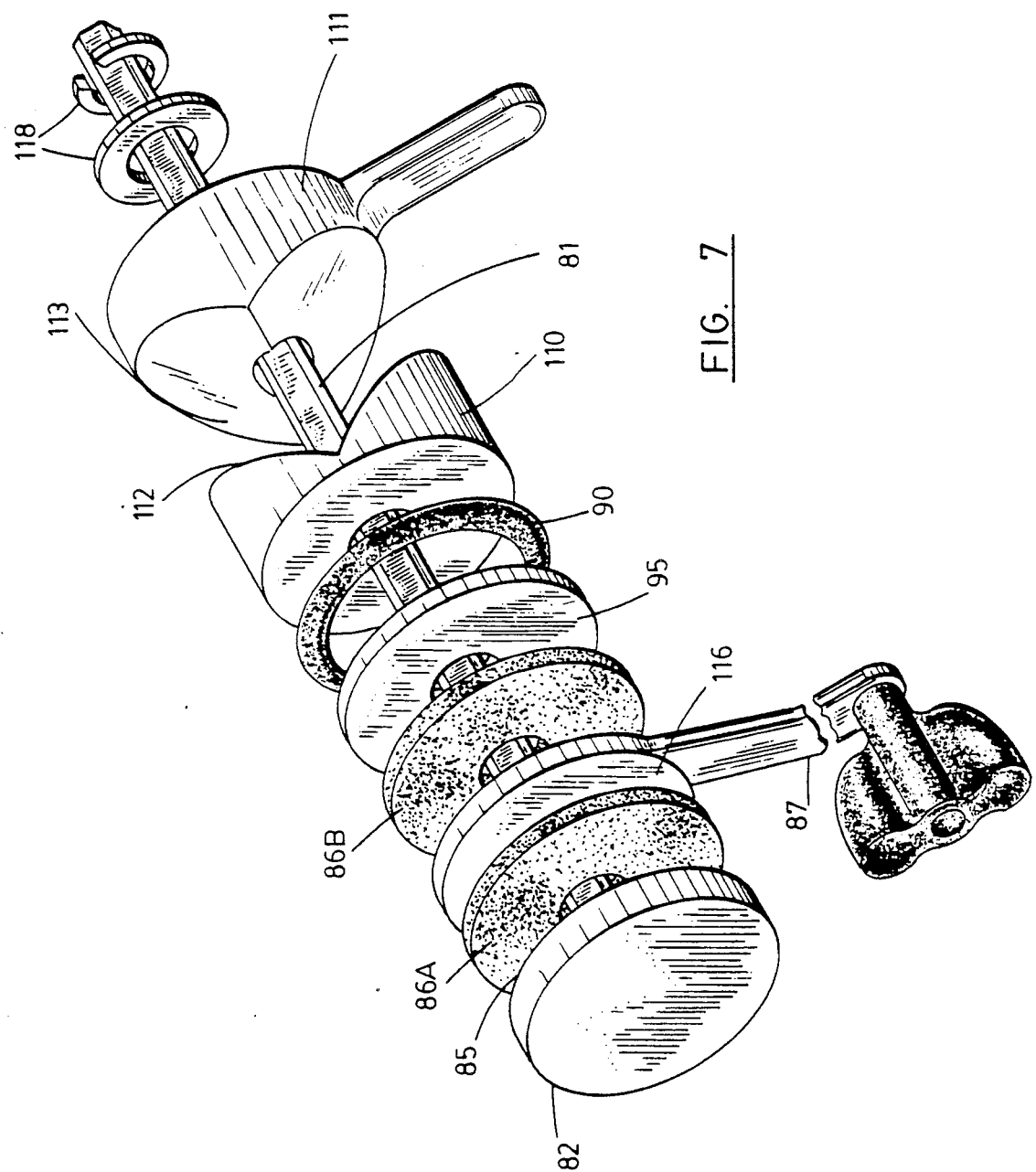
FIG. 7 is an exploded view of a dual drag assembly reel handle incorporating an alternate lever cam drag adjustment.

Alternatively, as shown in FIG. 7, a lever-cam arrangement can be used on the second drag assembly in place of a drag wheel to provide a means for selectively applying force to the input shaft. In such an arrangement, a cam 10 is slidably mounted on the input shaft 81 outside of the drag discs 86A, 86B to supply a compressive axial force on the clutch plate 85 and the reel handle arm surface 116. A rotatable lever 111 is rotatably mounted on the input shaft approximate to the cam 110 and held in place by a washer and snap ring assembly 118. The cam 110 and lever 111 have respective complimentary configured cam faces 112, 113 so that rotation of the lever 111 will urge the cam 110 toward the input shaft clutch face 85 (leftward in the drawings) and compress the reel handle cam surface 116 against the input shaft clutch face 85.

While the preferred embodiment of the invention has been shown and described, it will be obvious to those skilled in the art that changes and modifications may be made therein without departing from the true spirit and scope of the invention.

What we claim is:

1. A fishing reel of the type wherein a fishing line spool is stationary during a cast, said reel comprising:
  a line spool main shaft axially supported within a fishing reel body,
  a spool drag system engaging the line spool main shaft for applying a first selectively adjustable rotational resistance force to a spool connected to said line spool main shaft,
  a rotor rotatably mounted on said fishing reel body for winding fishing line onto said spool.
  an input shaft, transmission means drivingly interconnecting said input shaft to said rotor such that rotation of said input shaft causes rotation of the rotor, a handle rotatably engaging said input shaft, a rotor drag assembly for applying a second selectively adjustable rotational resistance force to the rotor, the rotor drag assembly including an adjustable clutch means disposed on said input shaft and operatively connected to said handle whereby, the clutch means transmits said second rotational resistance force from said handle to said input shaft.

2. The fishing reel of claim 1, further including a radial flange disposed on said input shaft and wherein said clutch means includes a clutch plate spaced apart from the radial flange, and a drag disc disposed in driving engagement between said clutch plate and said radial flange of said input shaft.

3. The fishing reel of claim 1, wherein said input shaft includes an engagement surface and said clutch means includes a wavespring interposed between said clutch plate and the input shaft engagement surface.

4. The fishing reel of claim 1, wherein said input shaft includes a radial flange, the input shaft radial flange having a radial flange clutch face and wherein said clutch means includes a clutch plate spaced apart from said input shaft radial flange, the input shaft radial flange clutch face facing a clutch face of the clutch plate, said clutch means further including at least one drag disc disposed on said input shaft between said input shaft radial flange clutch face and said clutch plate clutch face, the drag disc transmitting said second rotational resistance force from said reel handle to said clutch plate clutch face and further to said input shaft radial flange clutch face.

5. The fishing reel of claim 1, wherein the axis of said input shaft is angularly disposed form the axis of said line spool main shaft.

6. The fishing reel of claim 1, wherein said rotor drag assembly includes a rotor drag system drag wheel threadedly engaging said rotor drag assembly, the drag wheel including means for applying axial forces against said clutch means.

7. The fishing reel of claim 1, wherein said rotor drag assembly includes cam means engaging said rotor drag system assembly for applying axial forces against said clutch means.

8. The fishing reel of claim 1, wherein said rotor drag assembly includes a housing which engages one surface of said fishing reel body and said input shaft extends substantially through said fishing reel body such that an end thereof engages a second surface of said fishing reel body.

9. The fishing reel of claim 1, wherein said rotor drag assembly includes means for mounting said rotor drag assembly on said fishing reel body, the mounting means threadedly engaging a main drive gear of said fishing reel.

10. A kit of parts for converting a spinning or spin cast fishing reel having a single drag system for applying a first selectively adjustable rotational resistance force to a fishing reel line spool, into a fishing reel having two drag systems, in which said single drag system of said fishing reel applies a rotational resistance force to the fishing reel line spool, and wherein the fishing reel has a fishing reel body, a fishing reel line spool, a rotatable fishing reel rotor, a spool line shaft positioned within said fishing reel body which is operatively connected to said fishing reel line spool, a reel main drive gear positioned within said fishing reel body, the reel main drive gear being operatively connected to the fishing reel rotor, the kit of parts comprising:

a second drag assembly for applying the second selectively adjustable rotational resistance force to said fishing reel rotor to prevent rotation thereof said second drag assembly including means for mounting said second drag assembly to said fishing reel body, an input shaft adapted to extend within the fishing reel body, the input shaft having an axial extension which is adapted to drivingly engage said reel main drive gear of said fishing reel, said input shaft including an engagement surface, and adjustable clutch means operatively engaging said input shaft, said adjustable clutch means applying said second selectively adjustable rotational resistance force to the input shaft engagement surface, whereby, when said second drag assembly is mounted on said fishing reel and said input shaft engages said fishing reel main drive gear, said adjustable clutch means transmits said second adjustable rotational resistance force to said fishing reel rotor by way of said input shaft engagement surface.

11. The kit of parts of claim 10, further including a reel handle and said clutch means includes a clutch plate and a drag disc, the clutch plate being mounted on said input shaft, the clutch plate having a clutch face drivingly engaging the drag disc, said drag disc being interposed between said clutch plate clutch face and the reel handle.

12. The kit of parts of claim 10, wherein said second drag system assembly mounting means is adapted to engage one surface of said fishing reel body and said input shaft axial extension is adapted to engage another surface of said fishing reel body.

13. The kit of parts of claim 10, wherein said drag system assembly mounting means includes means disposed on said input shaft adapted to threadedly engage said main drive gear of said fishing reel.

14. The kit of parts of claim 10, further including a reel handle and wherein said clutch means includes a clutch plate and at least one drag disc, the drag disc being disposed on said input shaft between said clutch plate and a surface of the reel handle, the clutch plate having a clutch surface disposed generally parallel to the surface of said reel handle.

15. The kit of parts of claim 10, wherein said clutch means further includes a wavespring disposed on said input shaft interposed between a clutch face of a clutch plate and a radial flange of said input shaft, the clutch plate clutch face being generally parallel to said input shaft radial flange.

16. The kit of parts of claim 10, further including a second drag system drag wheel threadedly engaging said second drag system assembly to apply axial forces against said clutch means.

17. The kit of parts of claim 10, further including cam means engaging said second drag system assembly to apply axial forces against said clutch means.

18. The kit of parts of claim 11, wherein said second drag system mounting means is adapted to engage one surface of said fishing reel body, said input shaft is adapted to engage another surface of said fishing reel body, said clutch means includes a clutch plate having a radial flange with a clutch face thereon, said clutch means further including at least one drag disc disposed on said drive input shaft and interposed between said clutch plate radial flange clutch face and a drive surface disposed on a radial flange of said input shaft, said input shaft further having an axial pin disposed on said input shaft radial flange opposite said input shaft axial extension, the input shaft axial pin engaging a bore of said clutch plate, said clutch plate further including means for engaging said reel handle, and a second drag system drag wheel threadedly engaging a second drag system housing, the second drag system drag wheel having an engagement face which engages said clutch plate radial flange to provide an axial force thereagainst and thereby apply axial forces against said at least one drag disc, said clutch means being held within said second drag system housing.

19. A combined fishing reel handle-rotor drag assembly adapted to be mounted on a fishing reel, the fishing reel having a fishing reel body, a fishing reel rotor, a reel main drive gear and a line spool, the fishing reel rotor being driven by the reel main drive gear, the fishing reel having a first drag system engaging the line spool thereof and providing a first drag system for said line spool, the combined fishing reel handle-rotor drag system comprising: an input shaft, a fishing reel handle rotatably engaging the input shaft, said input shaft being adapted to be received within said reel body, said input shaft including means adapted to engage said reel main drive gear, said input shaft including a radial flange having a rotor driving face thereon and, said input shaft further including clutch means disposed between said handle and said radial flange, the clutch means operatively engaging said radial flange rotor driving face when said fishing reel handle is turned.

20. The combined fishing reel handle-rotor drag assembly of claim 19, wherein said clutch means includes a clutch plate spaced apart from said input shaft radial flange and a drag disc disposed on said input shaft in driving engagement with said clutch plate and said input shaft radial flange.

21. The combined fishing reel handle-rotor drag assembly of claim 19, wherein said input shaft includes means for mounting said combined fishing reel handle-rotor drag assembly on said fishing reel body in the form of a rotor drag assembly housing, said clutch means including a clutch plate having a radial flange clutch face thereon, said clutch means further including a drag disc disposed on said input shaft and interposed between said clutch plate radial flange clutch face and said input shaft radial flange rotor driving face, said input shaft extending through the rotor drag assembly housing, said clutch plate being disposed within said rotor drag assembly housing and having a rotor drag system drag adjustment wheel disposed adjacent thereto, said rotor drag system adjustment wheel including a clutch engagement face which engages said clutch plate and forces said clutch plate and drag disc against said reel handle drive input shaft when said drag adjustment wheel is turned, and applies an axial force against said input shaft radial flange, thereby selectively transmitting rotational force of said fishing reel handle to said fishing reel handle drive input shaft.

22. The combined fishing reel handle-rotor drag assembly of claim 19, further including means on said reel handle drive input shaft for mounting said combined fishing reel handle-rotor drag assembly on said fishing reel body, said clutch means including a clutch plate disposed on said fishing reel handle and at lease one drag disc disposed on said fishing reel handle drive input shaft and interposed between said reel handle drive input shaft radial flange and, said clutch plate, rotor drag system drag adjustment wheel threadedly engaging said reel handle drive input shaft. said rotor drag system drag adjustment wheel having an engagement face thereon which operatively engages said clutch plate to provide thereagainst, thereby transmitting rotational force from said fishing reel handle to said reel handle drive input shaft.

23. In a fishing reel of the type wherein a fishing line spool is stationary during a cast, the fishing reel having a handle, a spool line shaft reciprocatably mounted within a body of said fishing reel, a line spool mounted on the spool line shaft, a rotor means rotating around the line spool when the handle is turned, the rotor means engaging a fishing line of said line spool when said rotor means is rotated so as to wrap the line around said line spool, a first drag system engaging said spool line shaft for applying a selectively adjustable rotational resistance force to said line spool, the improvement comprising, a second drag system for applying a selectively adjustable rotational resistance force to said fishing reel rotor means, the second drag system being mounted on the fishing reel body between the fishing reel handle and said fishing reel body, said second drag system including an input shaft angularly disposed from said spool line shaft, gear means operatively connecting the input shaft to said fishing reel rotor means and clutch means operatively engaging said input shaft, said fishing reel handle engaging said clutch means, said second drag system further including means for adjusting the clutch means, said clutch means transmitting a selectively adjustable rotational resistance force to said rotor means by engaging said input shaft when said handle is turned.

24. The fishing reel of claim 23, wherein said input shaft includes a radial flange, said clutch means further including a clutch plate spaced apart from the input shaft radial flange, and a drag disc disposed in driving engagement between said clutch plate and said input shaft radial flange.

25. The fishing reel of claim 23, wherein said second rotor drag system includes a rotor drag system adjustment wheel threadedly engaging said rotor drag assembly.

26. The fishing reel of claim 23, wherein said second rotor drag system includes a rotor drag system cam means which compressively engages said rotor drag assembly.

27. A fishing reel having a reel body, a line spool shaft held within the reel body, a rotor driving input shaft extending within said reel body transversely to the line spool shaft, a line spool supported on said line spool shaft, the fishing reel further including a dual drag system, a first drag system of the dual drag system applying a selectively variable resistance force to the line spool, a second drag system of said dual drag system applying a selectively variable resistance force to said rotor driving input shaft, the fishing reel further including a rotor capable of rotational movement around said line spool, gear means drivingly interconnecting said rotor driving input shaft to said rotor, a fishing reel handle operatively connected to said rotor driving input shaft, said rotor driving input shaft including an engagement surface, said second drag system including clutch means disposed on the exterior of said fishing reel body between said reel handle and the engagement surface of said rotor driving input shaft, said clutch means selectively transmitting a variable rotational force from said reel handle to said rotor driving input shaft engagement surface to thereby variably drive said rotor in rotation around said line spool without drivingly contacting an exterior surface of said rotor.

* * * * *